Jan. 20, 1953     D. E. BECKETT ET AL     2,625,844
ATTACHMENT FOR MECHANICALLY ACTUATING THE MANUALLY
OPERABLE FEED ACTUATOR SHAFTS OF MACHINE TOOLS
Filed Oct. 20, 1947     3 Sheets-Sheet 1

INVENTORS
DONALD E. BECKETT
WILLIAM N. BECKETT
BY
J. Warren Kinney Jr.
ATTORNEY

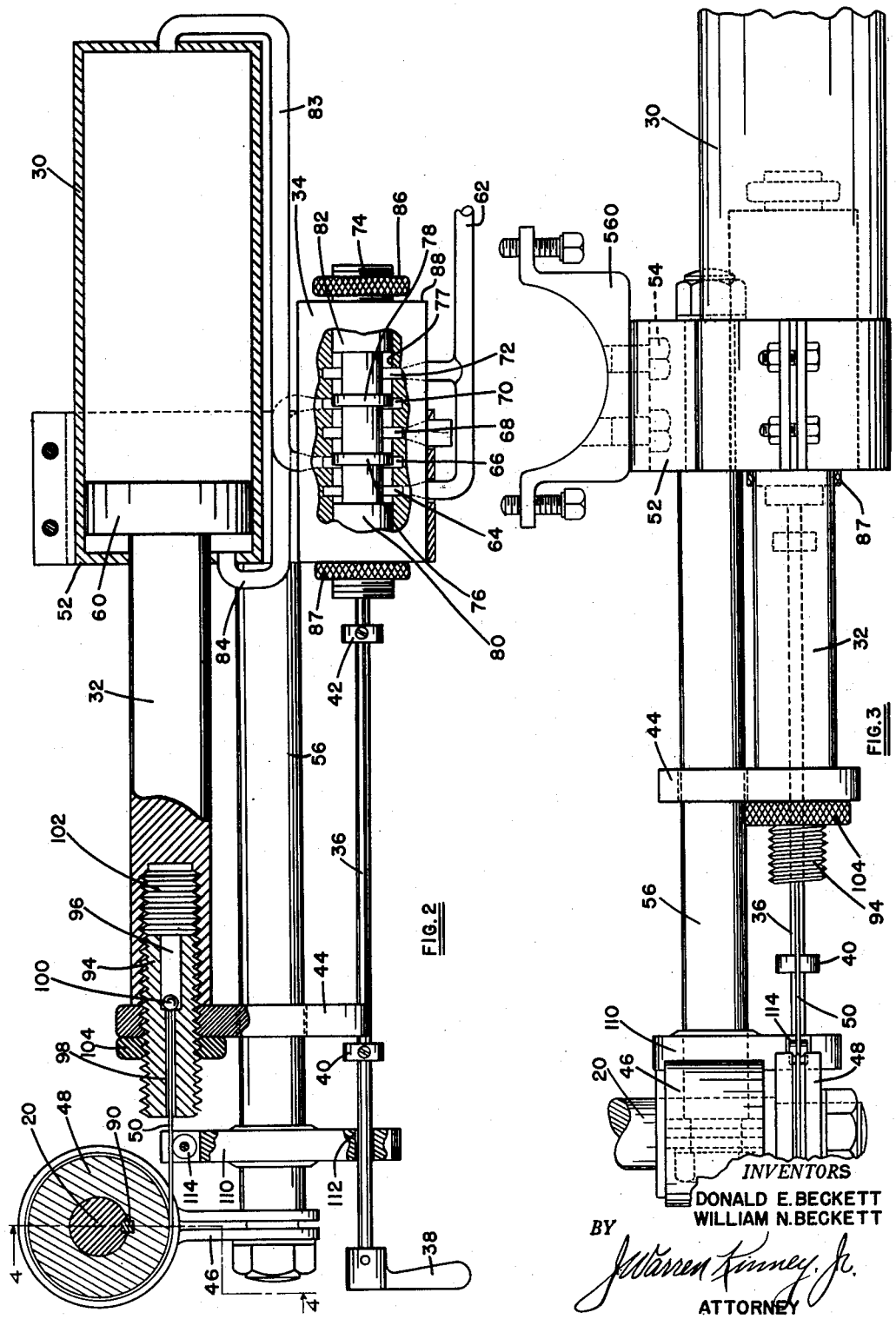

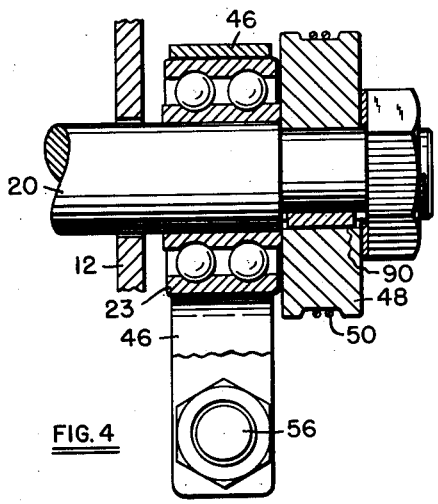
FIG. 4
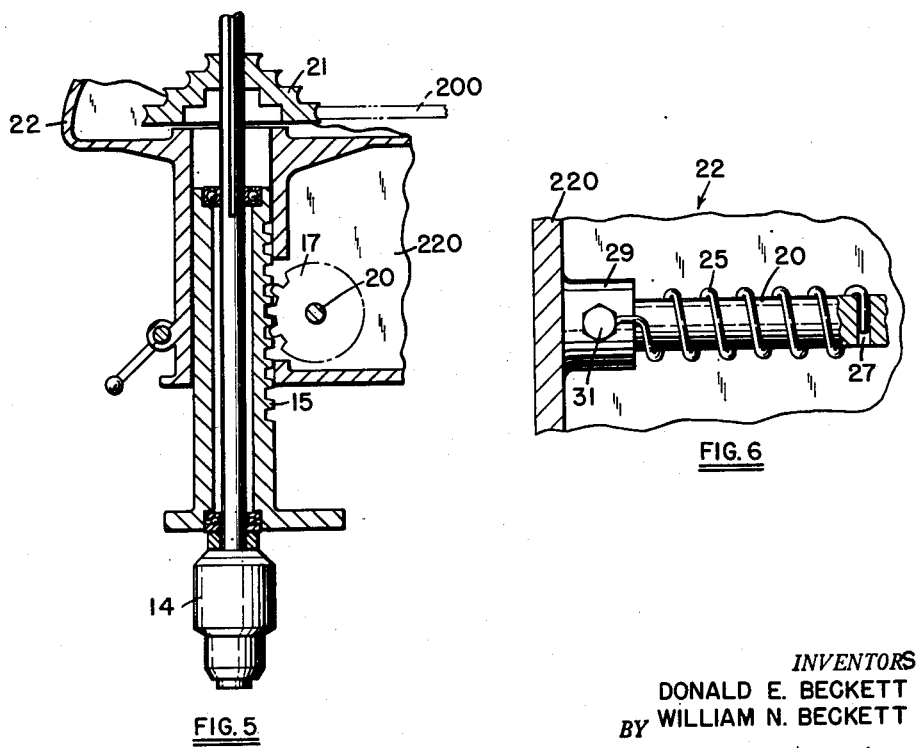
FIG. 5
FIG. 6
*INVENTORS*
DONALD E. BECKETT
BY WILLIAM N. BECKETT
J Warren Kinney Jr.
ATTORNEY Patented Jan. 20, 1953

2,625,844

UNITED STATES PATENT OFFICE 2,625,844

ATTACHMENT FOR MECHANICALLY ACTUATING THE MANUALLY OPERABLE FEED ACTUATOR SHAFTS OF MACHINE TOOLS

Donald E. Beckett and William N. Beckett, Wilmington, Ohio, assignors of one-fourth to Herber W. Harcum and one-fourth to J. Bates Harcum, both of Wilmington, Ohio Application October 20, 1947, Serial No. 780,800

5 Claims. (Cl. 77—33.7)

1

This invention relates to control means, and more particularly to means for controlling the feed characteristics of devices such as drill presses, punch presses, and the like.

An object of the present invention is to provide simple, yet highly effective means for advancing and retracting the spindle of machine tools such as, by way of example, a drill press, or the like.

A further object of the invention is to provide means for advancing or feeding the spindle of a drill press at a steady or uniform rate.

Still a further object of the invention is to provide an automatic drill press feed mechanism which will materially lessen drill breakage due to malalignment of the drill or from improper feed pressures.

Another object of the invention is to provide a universal feed mechanism which may be quickly and easily attached to any of the various drill presses presently on the market.

Another object of the invention is to provide a spindle feed mechanism which operates throughout its entire spindle advancing and retracting cycle under tension, and against force of the spindle retracting means normally associated with drill presses, thereby precluding lost motion and objectionable play inherent in other types of spindle feed control mechanism.

A further object of the invention is to teach a new method of precision drilling without requiring the use of jigs or other similar fixtures.

Still a further object of the invention is to provide a spindle feed mechanism for a drill dress which will enable an operator to control the axial movement of the spindle either automatically or manually, and which will further permit an operator to interrupt and/or reverse an automatic cycle in any phase thereof.

Still a further object of the invention is to provide a feed mechanism for drill presses and the like wherein the feed pressure will not build up or accumulate until after the drill has encountered the surface of the substance to be drilled, and wherein the rate at which the pressure is then applied is constant and steady, thereby greatly lessening the drill breakage associated with uneven or irregular feed.

Another object of the invention is to provide a spindle feed mechanism having the hereinabove described characteristics and which may be inexpensively manufactured using modern mass production techniques.

These and other objects are attained by the means described herein and as disclosed in the accompanying drawings, in which:

2

Fig. 2 is a side view, partly in section, illustrating the structural details of the spindle feed mechanism of the present invention.

Fig. 3 is a top view of the device of Fig. 2, but with plunger 32 in a partially retracted position.

Fig. 4 is a sectional view taken on line 4—4 of Fig. 2.

Fig. 5 is a sectional view of a typical spindle actuating mechanism.

Fig. 6 is a detail of a typical yieldable spindle-retracting means.

Figure 1:
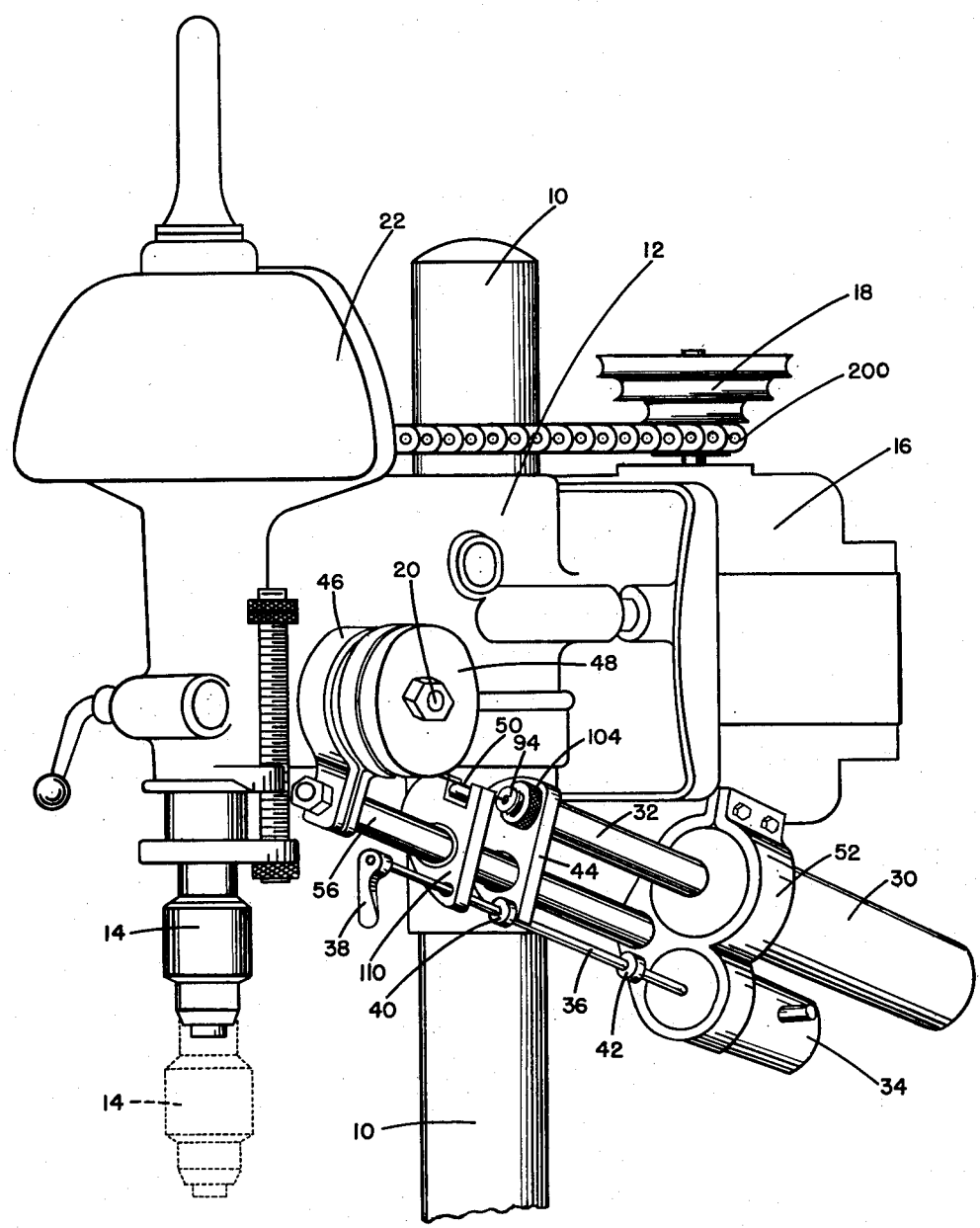
Fig. 1 is a side view of a typical drill press provided with a spindle feed mechanism embodying the teachings of the present invention.

With reference now to Fig. 1, the numeral 10 indicates generally the upright support or column to which a drilling mechanism, indicated generally by the numeral 12, is secured. A work table or platform (not illustrated) is usually secured to and carried by column 10 below the drilling mechanism for supporting the work to be drilled.

The drilling mechanism includes a spindle 14 mounted for rotary and axial movement, said rotary motion being provided by means of a motor 16, pulleys 18 and a flexible drive member 200 which connects pulleys 18 in driving relationship with other pulleys 21 located within housing 22, see Fig. 5. Axial movement of spindle 14 may be accomplished by means of a rack 15 secured relative to shaft 14 engageable by a pinion 17 mounted to a drive or actuating shaft 20 which extends outwardly from the housing of the drilling mechanism and to which a hand wheel is generally mounted. Other means, such as, by way of example, are illustrated in Fig. 6, may be provided interiorly of housing 22 for normally and yieldingly retracting said spindle 14 upwardly to the upper limit of its stroke, said means including a coil spring 25 loosely engaging shaft 20. One end of the spring may be secured to the shaft as at 27, the opposite end being anchored to boss 29 on wall 220 of the housing, as at 31. It should be understood that the present invention is not concerned with nor directed to the specific structural details of the drilling mechanism hereinabove briefly described, it being understood that such details are old in the art and are conventional with drill presses of the general class to which this invention is directed.

The spindle feed mechanism of the present invention includes a work cylinder 30, and a plunger 32 constructed and arranged for reciprocation incident to the introduction of pressure media into one or the other of the opposite ends of cylinder 30, as will be hereinafter more fully explained.

A valve 34 is provided for controlling the operating characteristics of plunger 32, said valve including an elongated control rod 36, the outer or free end of which terminates in a control knob 38 located adjacent spindle 14 and below drive shaft 20. Stop members 40 and 42 may be adjustably secured to control rod 36, said members being engageable by an interfering member 44 secured to and carried by piston 32.

The hand wheel usually associated with the drive or actuating shaft 20 of the drilling mechanism may be removed after which an anti-friction bearing may be slipped onto said shaft. The width of said bearing 23 should be of a dimension less than the overall projecting length of shaft 20 in order to accommodate a rotatable member or pulley 48 which may be keyed or otherwise secured in driving relationship to the outer end of said shaft. A clamp 46 is mounted over the outer periphery of said bearing whereby to permit free rotation of shaft 20 relative to said clamp.

The rotatable member or pulley 48 may be connected by suitable means, such as, by way of example, a flexible element 50, to plunger 32 whereby axial movement of said plunger will be translated to rotary motion of member 48 and shaft 20, which in turn will impart an axial movement to spindle 14 against the counterforce of the yieldable means which normally urges it to a fully retracted position at the upper end of its stroke.

Cylinder 30 and valve 34 may be mounted in side-by-side relationship by a suitable clamping member 52 which may be secured, by means of bolts 54 (see Fig. 3) to a mounting bracket 560 adapted to be clamped to column 10 immediately below the drilling mechanism. A support rod or guide element 56 extends between clamp 46 and clamping member 52 for fixedly mounting them in proper alignment.

With reference now to Fig. 2 it will be observed that cylinder 30 is provided with a piston 60 to which plunger 32 is secured. Pressure media from a suitable supply line 62 is selectively fed to opposite ends of cylinder 30 by means of valve 34, which valve comprises the subject matter of our Patent No. 2,586,906. Said valve comprises an outer housing which is provided with a longitudinally extending bore 77 having a plurality of laterally spaced similar ports 64, 66, 68, 70 and 72 in open communication therewith. Ports 64 and 72 comprise pressure or intake ports, ports 66 and 70 comprise work or outlet ports and port 68 comprises an exhaust port.

A reciprocable one-piece valve stem 74 slideably engages bore 77 of the valve housing, said stem including a pair of laterally spaced centrally disposed pistons 76 and 78, and a pair of end pistons 80 and 82. Axial movement of valve stem 74 will isolate, or connect one end on the other of cylinder 30 with the pressure media of conduit 62, it being understood that in Fig. 2, the pressure media will flow via intake port 64 into work port 66, thence thru conduit 83 into the right end of cylinder 30 for urging piston 60 and plunger 32 to the left. The left end of the cylinder is connected by way of conduit 84 to exhaust port 68 via work port 70 which is in open communication therewith.

As illustrated in Fig. 2, interfering member 44, which is secured to and carried by plunger 32, is about to engage stop member 40 of the elongated valve control rod 36, it being understood that such contact will effect an axial shifting of rod 36 and its associated valve stem 74 to the left, thereby reversing the flow of pressure media from the right side to the left side of piston 60.

The overall movement of valve stem 74 to the left will be determined by contact of lock nut 86 with end 88 of valve housing 34. In this connection it will be observed that the relative settings of lock nuts or adjustable abutment members 86 and 87 relative to valve stem 74 determine the stroke characteristics of plunger 32. By adjusting the lock nuts, the relative rates of travel of the forward and return strokes of plungers 32 may be accurately and precisely governed by controlling the rate at which pressure media is introduced into the ends of cylinder 30. By way of example, if it should be desirable to provide a slow rate of feed to spindle 14 with a rapid retraction, lock nut 86 would be adjusted in such a manner as to permit piston 78 to uncover work port 70 on its intake side by a small amount, whereby pressure media will be slowly, yet steadily, introduced into the left end of cylinder 30 for retracting plunger 32 to the right. The axial movement of plunger 32 to the right will cause drive or control shaft 20 to be rotated in a counterclockwise direction for advancing spindle 14 downwardly from the upper end of its stroke and against the counterforce of the yieldable means which normally urges said spindle to the upper end of its stroke.

By adjusting lock nut 87 relative to valve stem 74 whereby piston 76 will uncover work port 66 on its pressure side to a greater degree than piston 78 uncovered work port 70 on its pressure side, pressure media will flow more rapidly into the right end of cylinder 30 for quickly moving plunger 32 to the left for effecting a rapid retraction of spindle 14. By adjusting nuts 86 and 87 so that the rate of flow of pressure media to opposite ends of cylinder 30 will be equal, spindle 14 will be advanced and retracted at the same rate.

It should be understood that the resilient means which normally retracts the spindle to the upper end of its stroke will be of such design and characteristics as to continuously place flexible member 50 under tension throughout all phases of the operating cycle of plunger 32.

As more fully set forth in our hereinabove identified patent, the overall width of each of pistons 76 and 78 may be of a dimension of but five thousandths of an inch greater than the overall width of their respective work ports 66 and 70. In other words, if pistons 76 and 78 are disposed in obstructing relationship with their respective work ports 66 and 70, the control characteristics of the valve will become effective when the valve stem has been shifted in either direction by a dimension as small as two and one-half thousandths of an inch. This sensitivity makes it possible for the operating characteristics of plunger 32 to be controlled in response to slight axial movement of control rod 36, the overall movement of which may be for most installations of a dimension approximating one-eighth of an inch, thereby affording highly flexible, yet finger tip control of the axial movement of spindle 14.

As disclosed in Fig. 2, rotatable member or pulley 48 has been secured in driving relationship with shaft 20 by means of key 90. In the preferred embodiment of the invention we provide a flexible element 50 one end of which is wrapped around rotatable member 48, and the other end of which is secured relative to plunger 32. In order to provide adjustment and proper tension control of the flexible element we provide an externally threaded stub shaft 94 provided with an enlarged recessed opening 96 in open communication with its inner end, and an opening 98 of smaller diameter extending forwardly from the inner or closed end of recess 96 and terminating in the forward end of said shaft. One end of flexible element 50 may be provided with an interfering element 100 dimensioned to fit within recess 96 but of a dimension too large to enter opening 98, as illustrated. Stub shaft 94 is adapted to engage the internally threaded portion 102 of plunger 32, thereby providing for its axial adjustment relative to said plunger.

Interfering member 44 may be secured relative to plunger 32 by threadably engaging shaft 94 beyond the end of plunger 32. It may be securely locked in place by means of lock nut 104, as illustrated.

In the preferred embodiment of the invention we provide a guide plate 110 which may be fixedly secured to and adjacent the outer end of support member 56. The plate may include an aperture 112 thru which the valve control rod 36 may slideably extend, and it may likewise include a rotatable bearing member 114 over which flexible element 50 passes thereby assuring proper alignment of said flexible element with and relative to plunger 32 incident to its axial movement.

In operation the operator of the press may initiate movement of spindle 14 downwardly against the counterforce of the means which normally and yieldably urges said spindle to its fully raised retracted position, by pulling outwardly on control button 38 for shifting valve stem 74 to the opposite end of its stroke from that illustrated in Fig. 2, whereby pressure media will enter the left end of cylinder 30 for moving piston 60 and plunger 32 to the right. Axial movement of the plunger to the right will impart a counterclockwise rotary motion to rotatable member 48 which will effect a lowering of spindle 14 against the counterforce of the spindle retracting means. When the spindle has been lowered the desired distance its axial travel may be stopped or reversed by manipulation of control button 38 for disposing pistons 76 and 78 in obstructing relationship relative to their respective ports 66 and 70, or for shifting said pistons to the positions illustrated in Fig. 2 for reversing the direction of travel of plunger 32.

If desired, stops 40 and 42 may be set whereby the axial movement of spindle 14 will be automatically controlled by reason of the valve stem 74 being shifted incident to contact of interfering plate 44 with stops 40 and 42. In this manner the spindle will be automatically retracted after it has been lowered by a definite and predetermined distance, and, after having been retracted a predetermined distance it may be automatically advanced, thereby repeating its cycle. Blind holes of uniform depth may be automatically drilled as well as through holes.

When the end of a drill, mounted in spindle 14, is first brought into contact with the surface through which it is to drill a hole there is little, if any, axial pressure being exerted thereon, wherefore the drill will have no tendency to bend, buckle up, cock or break but will have an opportunity to cut its way into the body of the material being drilled.

In those instances where it is desired to accomplish precision drilling without resorting to the use of expensive jigs or fixtures, the following procedure may be employed, viz.: Using a center punch or other suitable tool provide a punch mark or other suitable depression or recess into which the tip of a drill may be received and centered. Then by actuating control rod 36 lower spindle 14 until the end of the drill is centered in said recess or depression but with the drill stationary, that is, not rotating. Allow the drill to be urged downwardly under full drill advancing pressure, and then start rotation of the drill while continuing to apply the axial feed pressure. The resultant hole will be straight, clean and true.

By properly controlling the feed pressure it is practical to drill holes with drills as fine as No. 60 through steel plates up to two inches in thickness; and then by changing the drill to as large as can be accommodated by the particular drill press being used, another hole may be drilled beside the No. 60 hole with the same ease.

It should be noted that although the drill is fed automatically, the entire cycle is under control, in fact, finger tip control, of the operator. When it becomes desirable to retract a drill for clearing a hole or for applying a supply of cutting oil thereto, or for any other reason or purpose, all the operator need do is lightly touch control button 38 for actuating valve stem 74 of valve 34.

In view of the foregoing it is apparent that the spindle 14 will be positively advanced by means of the pressure media, air, supplied to cylinder 30, and that the cushion-like property inherent with a pressure media such as air will relieve the drill of that type of abuse to which it is subjected in positive feeds of the mechanical or hydraulic types. Heretofore considerable drill breakage has been encountered when a power fed drill encountered a blowhole, or other imperfection in the material being drilled. With our device the axial feed or advance of the spindle is somewhat elastic, thereby permitting the drill to cut its way thru the imperfection encountered in the material being drilled, and wherein the rate of drill feed is yieldably controlled. In other words, the cushion effect of the pressure media on opposite sides of piston 60 will effectively prevent the drill from dropping or plunging forward when it encounters an imperfection such as a blowhole. When a drill does plunge downwardly or forwardly thru a blowhole, it is quite often damaged under the impact with which it strikes the bottom or other side of the blowhole. In our device, the feeding or advance of the spindle is controlled and should a blowhole or other imperfection be encountered the spindle, and its associated drill, cannot plunge forwardly, but instead the spindle will be advanced at a uniform predetermined rate, thereby materially prolonging the life of the drill.

A serious disadvantage inherent in feeding mechanisms for drill presses occurs when the drills break thru the material being drilled. Elaborate spring and hydraulic check devices have been utilized to absorb the impact of the spindle when break thru occurs.

Our device eliminates the need of such energy absorbing devices since a break thru of as little as .005 of an inch will be sufficient to positively actuate control rod 36 for effecting a retraction of the spindle. The elastic characteristics of the pressure media enables the drill to jump forward by approximately .005 of an inch incident to break thru of a drill thru the bottom surface of the material being drilled. This motion is sufficient to assure a positive shifting of control rod 36 for actuating valve 34.

It should be understood that various changes and modifications in the structural details of the device may be made, within the scope of the appended claims, without departing from the spirit of the invention.

What is claimed is:

1. An attachment for mechanically rotating the manually operable spindle feed actuator shaft of a machine tool of the type in which one end of the spindle feed actuator shaft projects outwardly from the machine housing, said device comprising a clamp, an antifriction member housed within the clamp and receivable over the shaft end, a rotatable member receivable on said shaft, means for fixedly securing said member to the shaft, an elongated support bracket secured to and carried by said clamp, a fluid-actuated reciprocating mechanism, a reversing valve therefor, an actuating device for said valve, said mechanism, valve and actuating device carried by said bracket, means remote from said clamp for securing said bracket to the machine tool and flexible power transmission means interconnecting the reciprocating mechanism with said rotatable member for translating reciprocating motion of said mechanism to rotary motion of said rotatable member.

2. A portable attachment for mechanically rotating the manually operative spindle feed actuator shaft of a standard drill press, said attachment comprising a support element, means engageable with said shaft for suspending one end of said element therefrom, means remote from said shaft for fixedly securing the other end of said support element relative to the drill press, a drive member fixed to said shaft, a work cylinder, a piston therefor and a plunger, means securing said cylinder to said support element, fluid lines to said cylinder at opposite sides of the piston, a valve to selectively supply fluid under pressure to said fluid lines to cause reciprocal movement of the piston and plunger, said valve including a housing and a reciprocable spool the opposite ends of which project from said housing, means actuated by said plunger for controlling and reversing the operating cycle of said valve by shifting said spool relative to the housing, abutment means adjustably secured to and carried by the ends of said spool for engagement with the ends of the housing for determining the rate of travel of said piston in said cylinder by limiting the stroke of said spool, flexible means interconnecting said plunger with the drive member of the spindle feed actuator shaft for translating linear motion of the plunger to rotary motion of said shaft.

3. A spindle traversing attachment for the spindle traversing drive shaft of a standard upright drill press, said attachment comprising a clamp rotatably secured to and carried by the drive shaft, a drive member fixedly secured to and caried by said shaft, a work cylinder, a piston therefor and a plunger, a support element fixedly interconnecting said clamp and cylinder, means remote from said clamp fixedly securing the support element relative to said drill press, flexible means interconnecting said plunger relative to and in driving relationship with said drive member, fluid lines to said cylinder at opposite sides of the piston, a valve to selectively supply fluid under pressure to one or the other or neither of said lines to cause and control the reciprocal movement of the piston and plunger, a valve actuating rod extending from said valve and in substantial spaced parallelism with said plunger, stops secured to and carried by said rod, a stop engaging member secured to and carried by said plunger for engagement with said stops for actuating said valve to control the operating cycle and to reverse the flow of fluid to said cylinder for reversing the direction of travel of said piston, said valve actuating rod constructed and arranged for manual actuation from a location adjacent the spindle-traversing-actuator shaft of the drill press, for stopping, starting or reversing the direction of piston travel intermediate the ends of its stroke as determined by the relationship between the stops and said stop engaging member.

4. An attachment for mechanically rotating the manually operable spindle-traversing drive shaft of a machine tool having an axially shiftable spindle, said device comprising a clamp and a drive member each carried by the spindle-traversing drive shaft, said clamp rotatably secured thereto, said drive member fixedly secured thereto, a work cylinder, a piston therefor and a plunger, a combination guide and support element, a valve, a member interconnecting said cylinder and valve in side-by-side relationship, said guide and support element secured at one end to said member extending in substantial parallelism with said plunger for fixedly interconnecting said member relative to said clamp, a valve actuating rod extending from said valve and in substantial spaced parallelism with said plunger and combination guide and support element, stops secured to and carried by said rod, an interfering member secured to and carried by said plunger constructed and arranged to slidably engage said guide element and alternately engage said stop members for actuating said rod to control the operating characteristics of said valve, a guide plate secured to the clamp-adjacent end of said guide element having an aperture therein through which said actuating rod slidably extends, said guide plate being disposed beyond the outer limit of the plunger stroke and between said outer limit and said clamp, means connecting said plunger in driving relationship with said drive member, and means for securing said attachment to the machine tool remote from said clamp.

5. A self contained, portable attachment for mechanically rotating the manually operable spindle feed actuator shaft of a standard drill press, said attachment comprising a mounting element, means on said element engageable with said actuator shaft for journaling said element relative thereto, a rotatable member secured in driving relationship with said shaft, a work cylinder, a piston therefor and a plunger, fluid lines to said cylinder at opposite sides of the piston, a valve to selectively supply fluid under pressure to said fluid lines to cause reciprocal movement of the piston and plunger, said valve including a housing and a reciprocable spool the opposite ends of which project from said housing, a valve actuating rod extending from and in axial alignment with said spool and in substantial spaced parallelism with the mounting element, stops secured to and carried by said rod, an interfering member secured to and carried by said plunger constructed and arranged to engage said stops for controlling and reversing the operating cycle of said valve by shifting said spool relative to the housing, adjustable means secured to and carried by the ends of the spool for abutment with the ends of the housing for controlling the spool stroke in each direction for selectively and independently determining the rate of travel of said piston in each direction in said cylinder by controlling the stroke of said spool, flexible power transmission means interconnecting the plunger and rotatable member on said shaft for translating linear motion of the plunger to rotary motion of the shaft, and means for releasably securing the mounting element relative to the drill press.

DONALD E. BECKETT.
WILLIAM N. BECKETT.

REFERENCES CITED

The following references are of record in the file of this patent:

UNITED STATES PATENTS

| Number | Name | Date |
|---|---|---|
| 612,596 | Spencer | Oct. 18, 1898 |
| 710,257 | DeLeeuw | Sept. 30, 1902 |
| 896,571 | Ocain | Aug. 18, 1908 |
| 1,121,991 | Durkee | Dec. 22, 1914 |
| 1,580,094 | White | Apr. 6, 1928 |
| 1,667,138 | Barks | Apr. 24, 1928 |
| 1,816,829 | DeLeeuw | Aug. 4, 1931 |
| 2,161,375 | Monroe | June 6, 1939 |
| 2,286,026 | Towler | June 9, 1942 |
| 2,328,721 | Irrgang | Sept. 7, 1943 |
| 2,418,220 | Churchill | Apr. 1, 1947 |
| 2,430,019 | Jenkins | Nov. 4, 1947 |
| 2,444,228 | Huthsing | June 29, 1948 |

FOREIGN PATENTS

| Number | Country | Date |
|---|---|---|
| 557,009 | Great Britain | Nov. 1, 1943 |